United States Patent [19]
Voges

[11] 3,753,522
[45] Aug. 21, 1973

[54] SHEET TRANSFERRING DEVICE AND METHOD

[75] Inventor: Kenneth Voges, Red Bud, Ill.
[73] Assignee: Red Bud Industries, Inc., Red Bud, Ill.
[22] Filed: Feb. 19, 1971
[21] Appl. No.: 116,914

[52] U.S. Cl.................. 226/141, 226/150, 226/162, 226/179
[51] Int. Cl........................................... B65h 17/26
[58] Field of Search.................... 226/158, 159, 160, 226/161, 141, 162–167, 149, 150, 179

[56] References Cited
UNITED STATES PATENTS

| | | | |
|---|---|---|---|
| 3,194,100 | 7/1965 | Fehlberg | 226/150 X |
| 3,001,681 | 9/1961 | Wright | 226/150 |
| 3,377,008 | 4/1968 | Sutton | 226/179 X |
| 3,613,980 | 10/1971 | Kulig | 226/162 |
| 3,429,493 | 2/1969 | Lehmann | 226/162 X |

FOREIGN PATENTS OR APPLICATIONS

| | | | |
|---|---|---|---|
| 210,087 | 5/1925 | Great Britain | 226/167 |

Primary Examiner—Allen N. Knowles
Attorney—Paul M. Denk

[57] ABSTRACT

In a mechanized sheet transferring device a first movable gripping means is disposed adjacent the continuous sheet desired to be incrementally transferred forwardly of the device, with said gripping means alternately advancing said sheet forwardly of the device, whereupon a stationary gripping means effectively clamps said sheet stationary, while simultaneously the sheet may be sheared or punched by a mechanism, or the like, while the movable gripping means returns to its initial position. Since the movable gripping means is moved by means of a drive chain and motor-sprocket arrangement, this movable gripping means may be set at any position along the longitudinal length of the sheet moving surface of the device, to provide for precise advancement of the sheet material between shearing operations.

In the method of operation of this sheet transferring device, the movable gripping means alternately advances the sheet material a fixed distance, whereat circuitry energizes a stationary gripping means that clamps the sheet into fixed position, while said movable gripping means returns to its initial preset location along the sheet moving surface of the device.

9 Claims, 13 Drawing Figures

PATENTED AUG 21 1973

INVENTOR
KENNETH VOGES
BY Paul M. [signature]
ATTORNEY

INVENTOR
KENNETH VOGES

FIG. 13

SHEET TRANSFERRING DEVICE AND METHOD

BACKGROUND OF THE INVENTION

This invention relates generally to a sheet material moving device, preferably continuous sheet material, but more specifically, relates to a sheet moving device which provides for precise advancement of continuous sheet material over the full longitudinal length of the transferring device.

Prior sheet or feed stock transferring machines normally included a pair of feed rolls intermediate of which the continuous stock was inserted, i.e., just like in the old washing machine wringer, and would be transferred upon energization of its rolls. While such sheet moving devices are beneficial from the standpoint of providing transfer of continuous stock, such as from a roll or coil of material, such devices normally sacrificed accuracy due to slippage of the stock material. This occurs due to the oily or lubricated surface of such material to prevent its oxidation. Other prior sheet moving devices included mechanisms that were designed for transferring only individual lengths of precut stock material, as distinct from continuous rolls of sheet material. Generally, in such a prior art device, not only are they found to be inefficient with respect to speed of transfer of the sheet material, but such devices just could not be used upon continuous stock, which incidentally is the principal manner in which sheet material is furnished from the suppliers at the present time. Mechanisms of the latter category for transferring individual sheets of material were generally designed including a combination cylinder and piston sheet moving means whose extent of movement of the sheet material is limited only to the length of stroke of its individual piston within the cylinder.

In view of the foregoing, it is the principal object of this invention to provide a sheet transferring device which may be utilized in close proximity with other mechanisms, such as a shearing or punch press machines, to provide for sequential, but rapid, transfer of continuous stock to the machines at lengths heretofore unrealized.

It is another object of this invention to provide a sheet transferring device which is quite efficient in operation due to the precision transfer and fixation of the sheet material in preparation for a subsequent operation.

It is another object of this invention to provide a device for transferring sheet material wherein greater longitudinal lengths of the sheet material may be moved through the use of movable gripping means that may be shifted the entire longitudinal length of the sheet moving surfaces of said device.

It is a further object of this invention to provide a motorized precision air grip press feed which achieves precision timing in the displacement of continuous sheet material upon its surface through the combined cooperation of both electrically energized and air actuated movable and stationary sheet gripping means.

These and other objects of this invention will become more apparent to those skilled in the art upon reviewing the summary of this invention, the appended drawings, and the description of the preferred embodiment.

SUMMARY OF THE INVENTION

The sheet transferring device of this invention forms a sheet moving surface through the agency of a plurality of roller brackets that are aligned approximately parallel and longitudinally of the framework of this device. The series of rollers provide an approximate horizontal or planar surface which facilitates the free movement of the sheet material as it may be uncoiled from a roll of stock. Located proximate the forward end of this sheet transferring device are one or more stationary gripping means which are adjustable laterally with respect to each other, when a pair of such gripping means are employed, and which means are arranged just adjacent the lateral edge of the sheet material to be transferred. After the sheet material has been transferred a fixed distance upon the sheet moving surface, and to that precise length at which it is desired to be sheared or otherwise worked upon, just prior to said subsequent operation, the stationary gripping means will be energized to clamp the lateral edge of the sheet material and fix the same firmly in place. Disposed in longitudinal alignment with each stationary gripping means is a movable gripping means, which upon actuation will be shifted alternately towards or away from the stationary gripping means and the forward end of the transfer device. This movable gripping means is arranged for riding through bearing engagement upon a rail, and a drive means, formed of a chain drive that is moved by means of a pair of motors and sprocket provides for this longitudinal movement in said movable gripping means. This movable gripping means, like the stationary gripping means, includes a clamp which when energized will engage the lateral edge of the proximate sheet material, and while holding the same, the forward advancement of this gripping means provides for transfer of the sheet material forwardly of the device for a definite fixed distance.

The roller brackets used for forming the sheet moving surface are comprised of a plurality of brackets each having a series of aligned rollers connecting thereto, and each bracket is capable of removal from the device as when it is desired to lessen the width of the sheet moving surface, as when narrower material is being worked.

Both the movable and stationary gripping means of this invention achieve clamping through the actuation of air pistons which are forced into a clamping arrangement through the introduction of pressurized air into its respective piston chamber, but may be deactivated through the exhausting of said pressurized air when it is desired to release the engagement of a particular gripping means from the edge of the sheet material. Electrical circuitry coordinates the movements of the movable gripping means with respect to the sheet moving surface, and through the contact of said movable gripping means made upon switch means that are arranged, respectively, proximate the stationary gripping means, near the forward end of the sheet transferring device, and the back end of the sheet moving device, provides for the timed sequence of operation between the clamping of the air actuated stationary and movable gripping means, and the movements of the movable gripping means.

Since the movable gripping means of this invention are transferred at substantially high speeds, it has been found useful to provide means for decelerating its movements particularly as this gripping means approaches the stationary gripping means at the forward end of the sheet transfer device, or approaches the limit of its movement at the other end of the sheet transfer surface. To achieve this, a double acting cylinder includes a piston which is subject to movement retarding air pressure when shifted in either direction, and it is disposed for encountering stop means formed on the stationary gripping means, as when advancing, or it may encounter another adjustable stop means that is set at a fixed length along the longitudinal dimension of the rail upon which the movable gripping means rides. This double acting cylinder acts as a cushion that forces a deceleration in the speed of movement of the movable gripping means, just prior to said gripping means encountering the aforesaid switches that actuate electrical circuitry which de-energizes the motors of the drive means, along with initiating other functions.

The unique function that is achieved from this particular feeding device is that the rail upon which the movable gripping means rides extends the full longitudinal length of the sheet transferring device, and therefore, the movable gripping means may be set for movement either along the entire or partial length of the sheet transferring device, as desired. Greater lengths or increments of sheet material may be repeatedly advanced by a sheet transferring device of this design, and due to the power achieved through the use of dual motors that energize the drive means, high speeds may be achieved concomitantly.

DESCRIPTION OF THE PREFERRED EMBODIMENT

Figure 1:
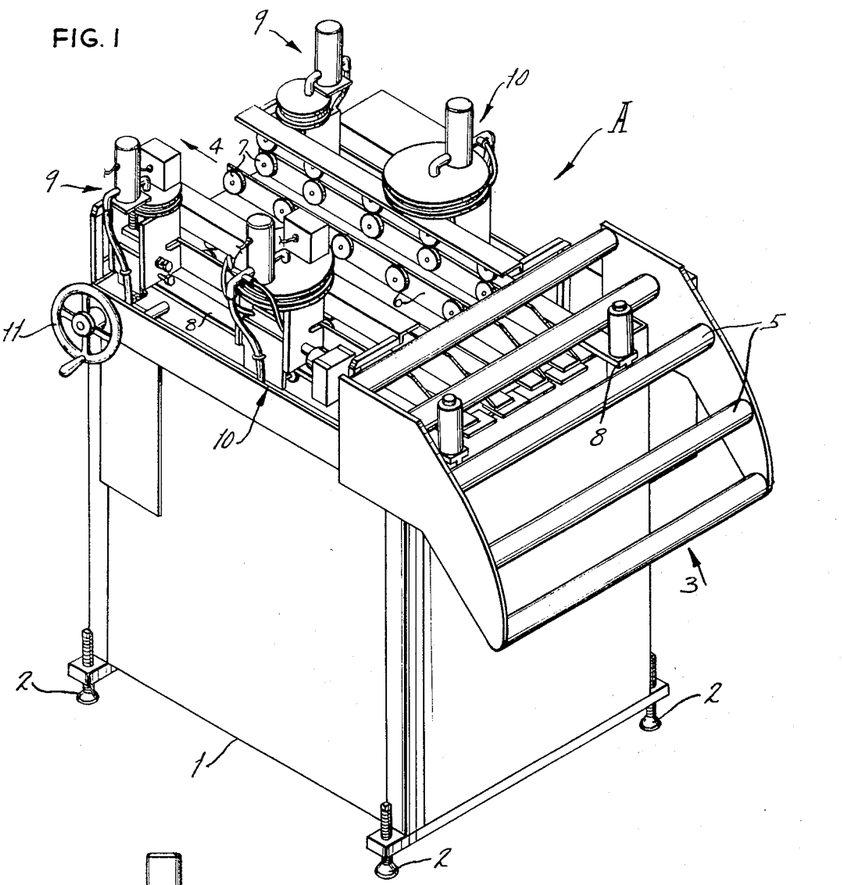
FIG. 1 provides a perspective view of the mechanized sheet transferring device of this invention.
Figure 2:
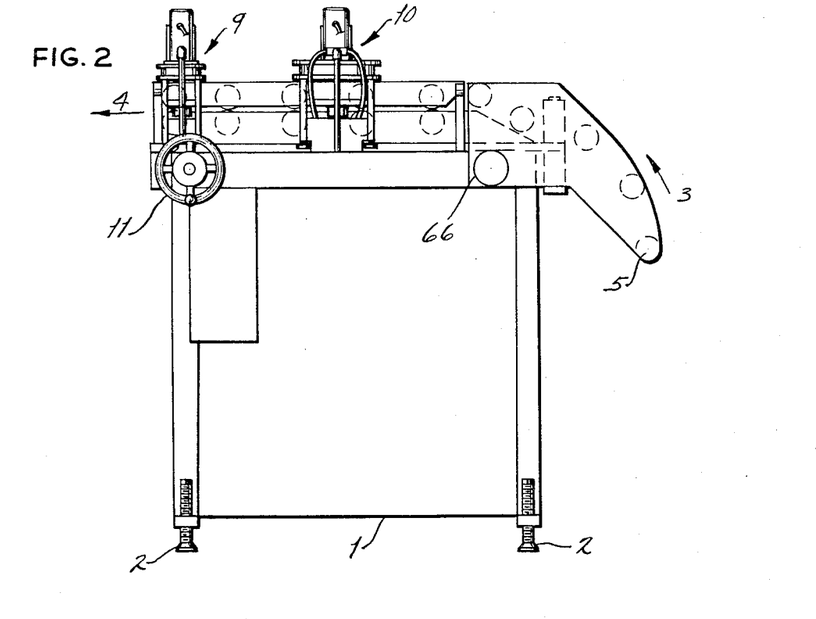
FIG. 2 provides a left side elevational view of the sheet transferring device of FIG. 1.
Figure 3:
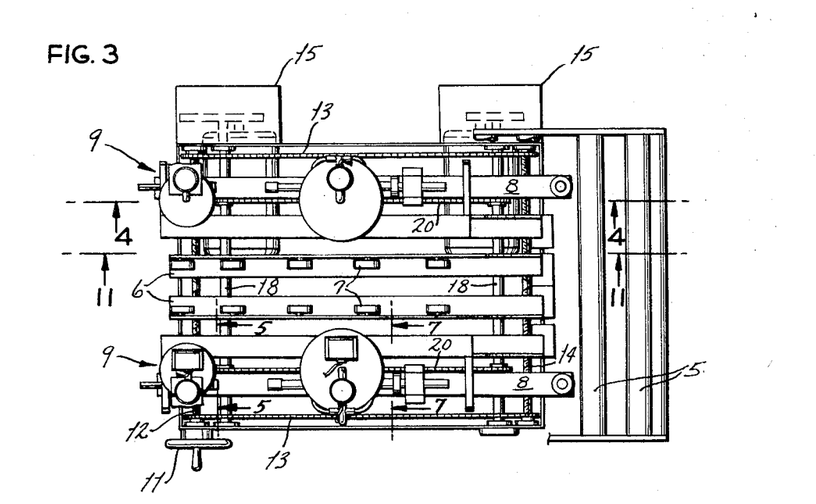
FIG. 3 provides a top plan view of the sheet transferring device of FIG. 1.

Referring now to the drawings, particularly FIGS. 1 through 3, the sheet transferring device of this invention is generally disclosed at A, comprising a framework 1 including a series of side and end panels supported by a structural subframework, said frame being supported upon adjustable legs 2 that allows for proper setting and vibration-free mounting of said device. Connecting proximate the back end of this device, as at 3, (and for purposes of describing this invention, the back end shall refer to that end of the device upon which the sheet material enters or moves onto the same, while the forward end of the device 4 relates to that front edge over which the sheet material passes as it is advanced by means of this device to other instrumentalities as previously described) are a series of rollers 5 that guide continuous stock onto the device. These rollers 5 facilitate the upward advancement of the stock material, as from a coil, onto the sheet moving surface of this device.

The sheet moving surface of this device is defined as that planar surface upon which the sheet material passes and advances, and it is formed by means of a series of roller brakcets, as at 6, which are generally longitudinally and parallel aligned, with each roller bracket having a series of bearing-mounted rollers as at 7, upon which sheet material may freely advance to the forward end of the device. The precise construction of the roller brackets, along with their portability attributes, will be subsequently described.

Also extending longitudinally proximate the sheet moving surface of this device are a pair of T-rails 8, and fixedly secured to the frontal portion of each said rail is a stationary gripping member 9 (which may also be called a 3 inch clamp), while mounted for longitudinal movement upon each of said rails is a movable gripping member 10 (which may likewise be called a 6 inch clamp). Each of these stationary and movable gripping members are arranged for disposition proximate the lateral edges of any sheet material that is desired to be advanced upon the sheet moving surface, and it is through the co-ordinated clamping actions of each of these gripping members that the force sufficient to induce pulling of sheet material onto the device, while simultaneously advancing it forwardly of said device, is achieved.

Both the left side stationary and movable gripping members may be adjusted laterally with respect to the surface simultaneously with the right side stationary and movable gripping members so that sheet material of a variety of widths may be handled by this device. By referring specifically to FIG. 3, it can be seen that a hand wheel 11 is connected for rotation to one side of this device, and said wheel connects directly with a double-threaded screw 12 located transversely the frontal portion of this device and which threadedly engages the T-rails 8, and through the agency of a link chain 13, a second double-threaded screw 14 is arranged for threaded engagement with the back end of the T-rails 8. Thus, through a turning of the hand wheel 11, both the double-threaded screws 12 and 14 will simultaneously turn in the same direction, and through their threaded engagement with the rails 8, will simultaneously provide for movement of said rails either towards or away from each other, depending upon the direction of rotation of said wheel 11. In this manner, precise settings of the rails, and their mounted stationary and movable gripping members, may be made with respect to the width of the sheet material to be handled by this device.

Figure 4:
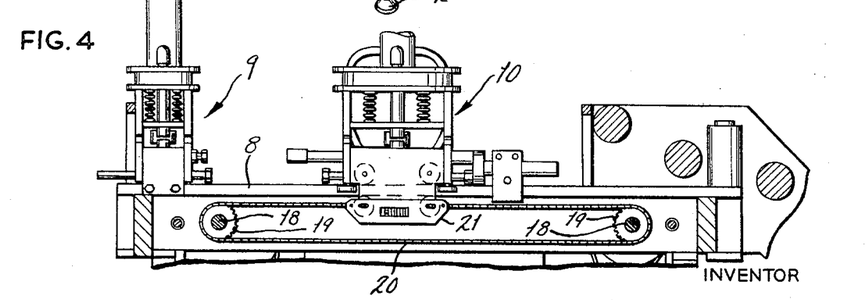
FIG. 4 is a partial longitudinal sectional view showing the right side drive means, and stationary and movable gripping means taken along the line 4—4 of FIG. 3.
Figures 10, 11, 12:
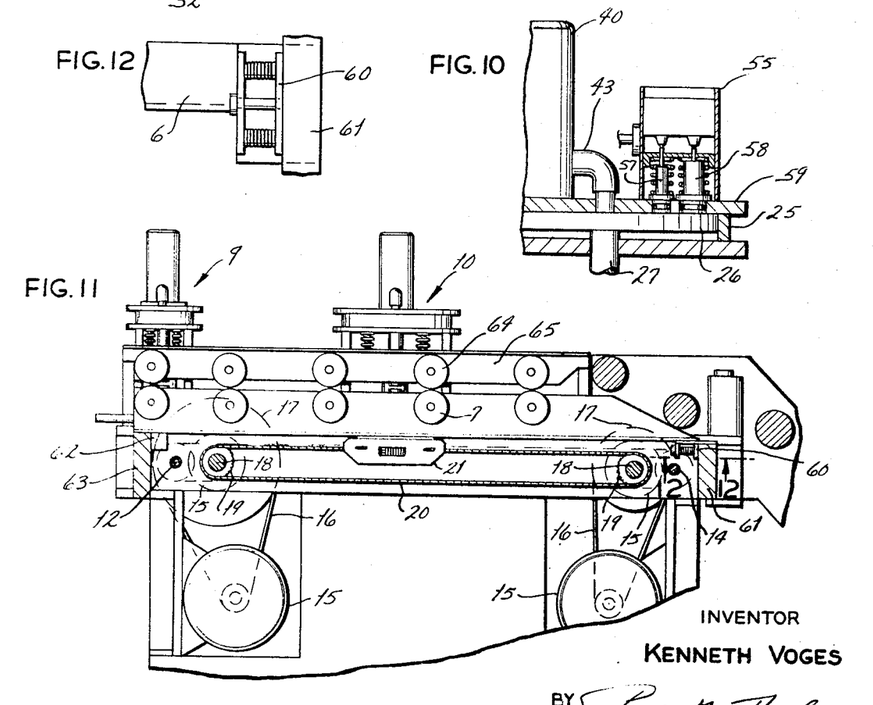
FIG. 10 is a partial transverse sectional view taken along line 10—10 of FIG. 9 showing the pressurized air-sensitive pistons and switches that dictate timed movements of said movable gripping means.
FIG. 11 is a partial longitudinal sectional view taken along line 11—11 of FIG. 3 showing a modified one of the roller brackets arranged in place upon said device.
FIG. 12 is a sectional view of a roller bracket mount taken along line 12—12 of FIG. 11.

By referring in addition to FIGS. 4 and 11, the mechanisms that provide for movement of the movable gripping members 10 are shown to comprise a pair of drive means 15 that include a motor and clutch combination, one each disposed at the forward and back ends of the device, and each of said combination connects by means of a belt, as at 16, to a pulley 17 which is linked by means of a shaft 18 to a sprocket 19 around which a chain 20 is geared. Thus, through energization of either one of said motors 15, the chain drive 20 may be turned in either direction of movement either towards the forward and/or the back end of the sheet moving device. This chain 20 is linked at either of its ends to a coupler 21 (see FIG. 8) which coupler mounts to the underside of its respective movable gripping member 10. The connection of the chain 20 to said coupler is effected through a spring means 22 so as to compensate for variations in chain lengths used in moving both of the movable gripping means when a pair of the same are employed.

Figures 6, 9:
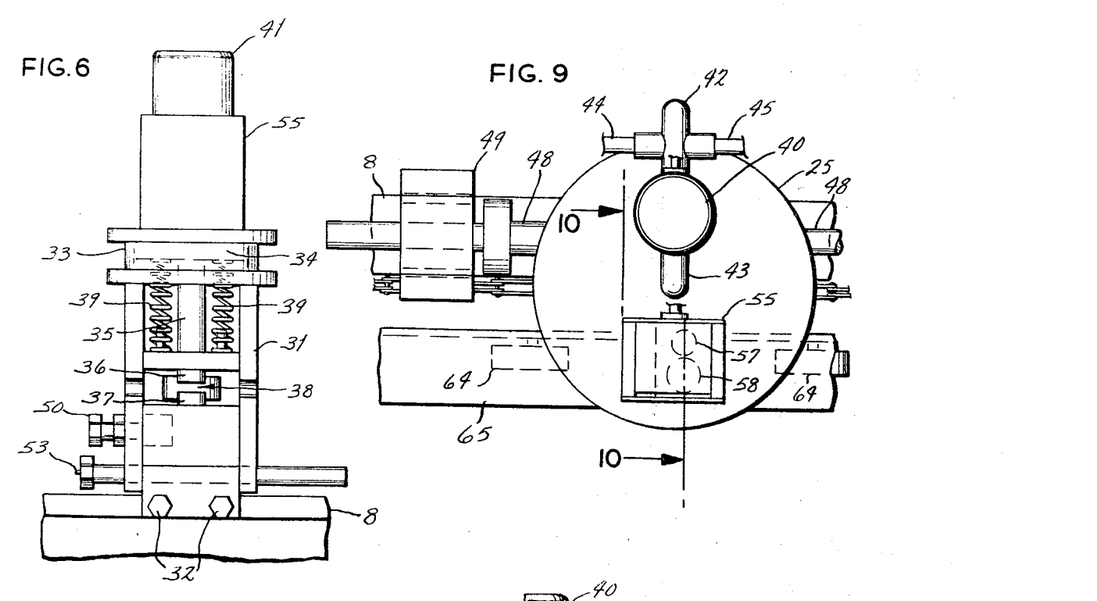
FIG. 6 is a partial sectional view of the left side stationary gripping means taken along the line 6—6 of FIG. 5.
FIG. 9 is a partial top view of the left side movable gripping means shown in FIG. 8.
Figure 7:
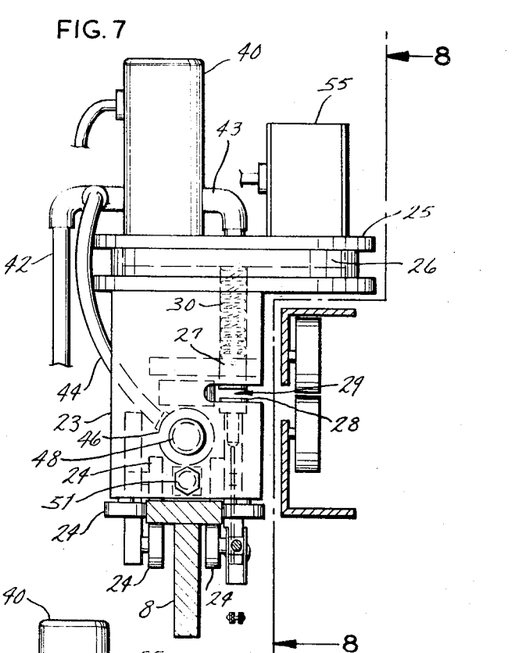
FIG. 7 is a partial transverse sectional view showing the left side movable gripping means taken along the line 7—7 of FIG. 3.
Figure 8:
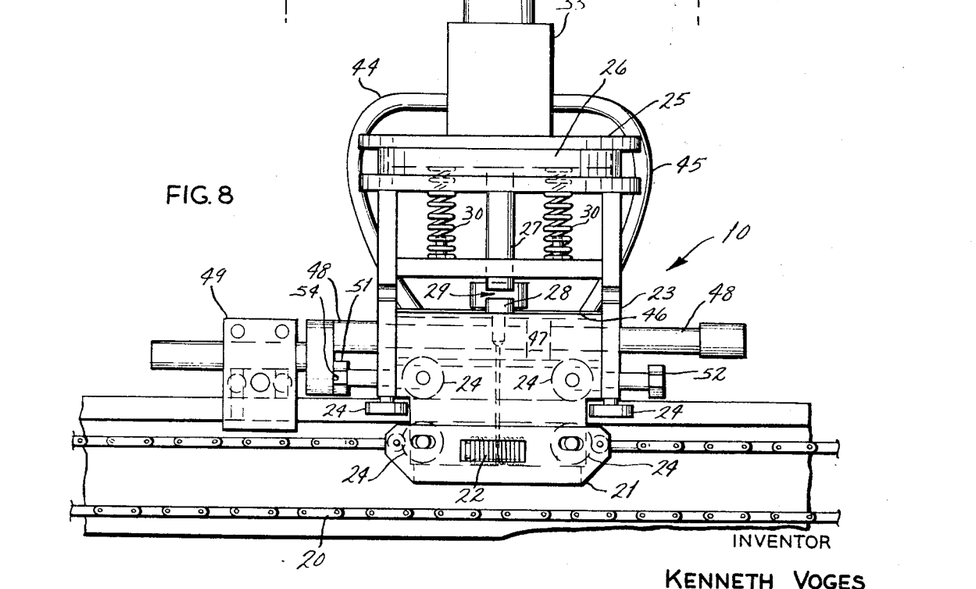
FIG. 8 is a partial sectional view showing the left side movable gripping means taken along the line 8—8 of FIG. 7.

The structure of each movable gripping member 10 is more accurately disclosed in FIGS. 7 through 9, and is shown comprising a housing 23 which has a series of rollers 24 rotatably mounted proximate its downward portion, with said rollers being so disposed to provide for their riding upon and in snug contact with the various faces of the embraced T-rail 8. Integrally mounted to the upward portion of each housing 23 is a piston chamber 25 which has disposed hermetically within its interior a piston, as at 26, which piston has depending downwardly from its central portion an integral rod 27. The downward face of this rod 27 is arranged in close proximity, but not touching under normal conditions, with a rod end 28 which is fixedly located concentrically below the rod 27 and within the lower portion of the housing 23. Thus, the spacing, as at 29, intermediate these two rod ends of each movable gripping member is provided so that the lateral edge of the sheet material may comfortably insert therebetween, and it is through the function of the piston 26, as when it is depressed downwardly by means of air pressure, that this lateral edge of the sheet material may be clamped, as when it is desired to move the movable gripping member forwardly so as to advance the sheet, or to the contrary, when said piston 26 is deactivated so as to allow said rods to disengage the sheet material as when it is necessary to return this movable piston to its rearward position with respect to the sheet moving surface. Obviously the sheet moving surface, as previously defined being located along a plane parallel with the upward edge of each of the rollers 7, is also disposed at the same level as the spacing 29 intermediate the two rods 27 and 28 of each movable gripping member.

Since the energization of the piston 26, as by the entrance of pressurized air into its chamber, causes its rod 27 to depress, as to achieve sheet clamping, when said pressurized air is exhausted, the bias of the springs 30 force the piston 26 upwardly so as to provide declamping of said sheet material. The various electrical connections, and the solenoid actuated valves that allow entrance of pressurized air into this movable gripping means, or exhaust the same, will be subsequently described.

Figure 5:
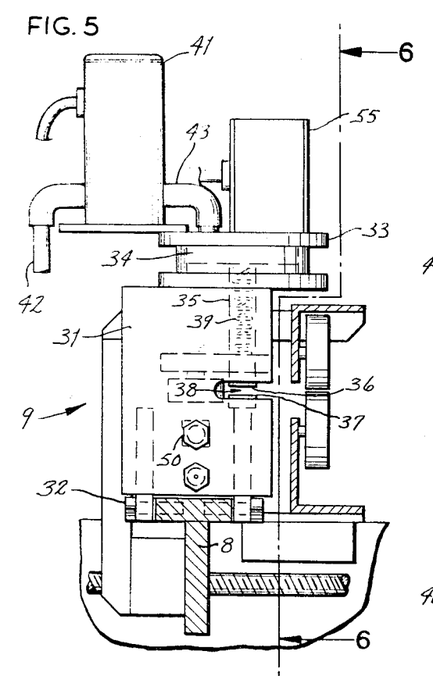
FIG. 5 is a partial transverse sectional view of the left side stationary gripping means taken along the line 5—5 of FIG. 3.

The structure of each stationary gripping member may be seen by reviewing FIGS. 5 and 6. The configuration and function of these stationary gripping members 9 are quite similar to that of the movable gripping members as just described, with the exception that said stationary member is designed to provide for clamping and fixation of the sheet material as when it has been already advanced that precise distance desired to next achieve its shearing, punching, or any other function to the fore of the device, and while the movable gripping member is retracted to its initial or starting position as set somewhere in the rearward regions of the device, and of this stationary member. Each stationary gripping member 9 also includes a housing 31 which is clamped by means of bolts 32 securely to the forward ends of the T-rails 8. Constructed in the upward end of the housing 31 is a piston chamber 33 including a piston 34 which is air actuated and disposed for limited vertical movement within said chamber. An integral rod 35 depends downwardly from said piston 34, and ends, as at 36, a small distance above a second rod 37 that is mounted fixedly in the downward portion of said housing 31. There is a space 38 formed intermediate said rods 36 and 37 through which the lateral edges of the sheet material may pass as when the piston 34 is at rest within its chamber, and is urged upwardly by means of the springs 39, but that upon energization of said piston by means of the entrance of pressurized air into the upward portion of its chamber, the rod 35 will be depressed downwardly, into clamping contact with the rod 37 and naturally upon any sheet material that may be disposed intermediate said two rod ends. As previously described, clamping of the lateral edges of any sheet material by means of this stationary gripping member is performed as when it is necessary to fix the sheet material in place, as when it is to be worked, and while the movable gripping member is returned to its initial position.

Each of the movable and stationary gripping members has mounted upon its piston chamber a solenoid operated valve, such as the solenoid operated valve 40 shown in FIG. 8 for the movable gripping member, and the solenoid operated valve 41 shown in FIG. 5 for the stationary gripping member. Each valve has an air line 42 connected to it providing for entrance of pressurized air from a source to each valve, and when the respective valves are actuated into open air conducting positions, air may be admitted through their lines 43 for entrance into their respective piston chambers. Actuation of said valves in an opposite direction provides for exhausting of pressurized air from said piston chambers as when it is desired to declamp the sheet material. Each of the movable gripping members is provided with an additional pair of air lines 44 and 45, which tap pressurized air from the air line 42, and said additional air lines continuously supply air into the cylinder 46 to either side of the piston 47 of the double acting piston rod 48. The function of this double acting piston is to allow for a mechanical deceleration in the speed of movement of the movable gripping member just as it comes into proximity with either the rearward stop 49 that has been set upon the T-rail 8, at or near the back side of the sheet moving surface, or when said movable gripping means encounters the stop 50 located on the side of the housing 31 of the stationary gripping member 9, as when the movable gripping member comes into proximity with the same as when advancing the sheet material. Also connecting to either side of the movable gripping member, just below the aforesaid double acting piston are a pair of adjustable stops 51 and 52, and said stops are disposed for encountering microswitches that mount respectively to the stationary gripping member, as at 53, and to the frontal portion of the stop 49, as at 54. It is just as likely, though, that these microswitches could be mounted within the stop means 51 and 52 of the movable gripping member. It is the depressing of these microswitches by the stops 51 and 52 that de-energizes the motors and clutches 15 that drive the chain drives 20, and provide for immediate cessation in the movement of said movable gripping members, as when they reach the limits of their forward and retracting movements. The precise sequence of operation of these microswitches are more fully explained in a subsequent description of the circuit diagram of this device.

Also connecting to the upward surface of each of the piston chambers 25 and 33 are microswitches 55, each of which switch includes instrumentalities that are sensitive to the amount of pressurized air that may be developed within their respective chambers, said switches being useful for instructing the various air solenoid operated valves as to just when a corresponding action should take place by the respective stationary or movable gripping members, or just when the movable gripping member should commence advancement with respect to the sheet moving surface. The structure of each of these microswitches 55 is more aptly depicted in FIG. 10, which shows each of said switches comprising a dual microswitch and having disposed therebeneath a pair of pistons 57 and 58 which when moved upwardly engage with their respective contacts of the microswitch. Each of these pistons 57 and 58 are hermetically disposed for sliding movement within the upward closure member 59 of each piston cylinder, cylinder 25 being herein shown by way of example, and since the piston 57 is of lesser diameter than the piston 58, it is designed and preset to move when it encounters approximately 50 to 60 psi of air that has been introduced into the chamber through the air line 43. Since the piston 58 is of greater diameter, and hence greater surface area, it is designed and predetermined to guage when approximately 10 psi of air pressure remains in the piston chamber. Thus, the capacity of air pressure introduced or remaining in the respective piston cylinders 25 and 34 of both the movable and stationary gripping members is always being gauged, and their respective microswitches, as at 55, are responsive to the amount of air pressure within the piston chambers at all times, so that when the movable gripping member has air of approximately 60 psi within its chamber, which thereby forces its piston downwardly into sheet clamping contact and instructs said member to move, the stationary gripping member will have already had its pressurized air exhausted and instructed the electrical circuitry when less than 10 psi air pressure is contained within its cylinder which allowed for an opening of its clamping means. When in this relationship, the sheet material may be advanced by the movable gripping means until its stop 52 encounters the microswitch 53 of the stationary member, which then reverses each of the solenoid air valves to allow for exhausting of air from the piston chamber of the movable member while allowing the entrance of pressurized air to the piston chamber of the stationary member. The pressurized air of the respective piston chambers is again gauged by their respective dual pistons 57 and 58 which actuate their respective microswitches for determining just when the movable gripping members shall be reactivated for returning to its initial position.

Figure 13:
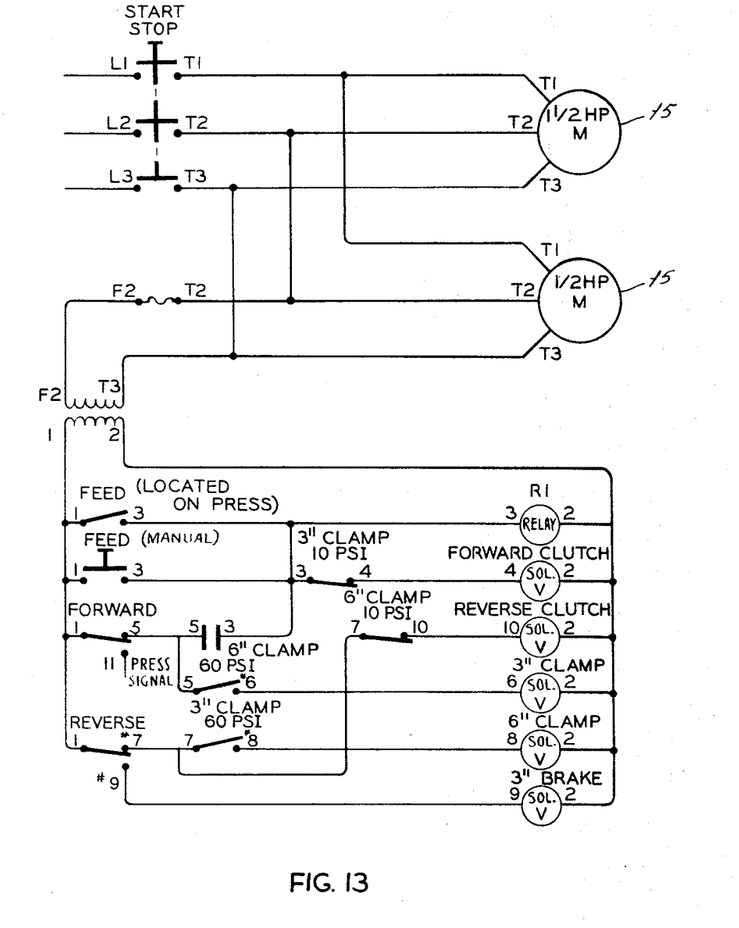
FIG. 13 discloses a circuit diagram of the electrical circuitry employed in the functioning of this sheet transferring device.

A description of the operation of electrical circuitry of this sheet transferring device may be as follows. By referring to FIG. 13, the starting position of this device is set by moving the reverse limit switch to its No. 9 contact, which energizes a three inch brake solenoid, this solenoid operating the brake 66 which holds the movable gripping member in place, particularly when it is set in its initial starting position; the 60 psi switch of the movable gripping member (6 inch clamp) is moved to contact No. 6; the solenoid of the stationary gripping member (3 inch clamp) is energized, and at the same time, the 10 psi switch of the movable gripping member (6 inch clamp) is open, as are all of the other switches as shown in this diagram. To start the cycle of this device, either a manual feed switch, or an automatic switch mounted on the press or shear, and defined as "located on press", is actuated. The closed feed switch whether it be manually or automatically tripped, actuates the relay R1 and the forward clutch-motor normally closed solenoid. The closed R1 relay holds in after release of the feed switch. The forward clutch-motor solenoid effects an energization of the forward clutch 15, which causes advancing movement of the movable gripping members, which thereby releases the reverse switch to its normal position at No. 7. At the end of the forward stroke of the movable gripping means, the forward microswitch 53 is depressed, and this releases the R1 relay, the forward clutch solenoid is deactivated which thereby deenergizes the forward clutch 15, as is the normally open solenoid 41 of the stationary gripping member. The de-energized or released normally open solenoid of the stationary gripping means (3 inch clamp) causes its piston chamber 33 to fill with pressurized air, and this air filled chamber shortly actuates its 60 psi microswitch into engagement with contact No. 8, which now changes the solenoid of the movable gripping member (6 inch clamp) while the 10 psi microswitch of the stationary gripping member (3 inch clamp) simultaneously moves into an open position which maintains an open circuit to the forward clutch normally closed solenoid, even through the R1 relay may have become reset. The energized solenoid of the movable gripping member (6 inch clamp) releases air from the cylinder of this member, which moves its 10 psi switch into contact with contact No. 10, which consequently energizes the normally closed solenoid of the reversing clutch, as located at the back side of the device, while the 60 psi microswitch of the movable gripping member is actuated into an open position which maintains an open circuit to the normally open, but now de-energized, solenoid of the stationary gripping member. The normally closed solenoid of the reversing clutch-motor causes a reverse movement of the movable gripper thereby releasing the forward switch to its normal position. At the end of the reverse stroke of the movable gripper, the switch 54 of stop 49 is depressed. This depressed switch releases the normally closed solenoid of the reversing clutch-motor combination, it also releases the normally open solenoid of the movable gripping member (6 inch clamp), while simultaneously energizing the normally closed solenoid of the disc brake, which holds the movable grippers firmly in place. The released normally open solenoid of the movable gripping member causes its cylinder to fill with air, and this air filled cylinder moves its 10 psi switch into open position which releases the normally closed solenoid of the reversing motor and moves its 60 psi switch into closed position for energizing the normally open solenoid of the stationary gripping member to exhaust pressurized air from its chamber and provide declamping of the sheet material by said stationary member. The cycle of operation is now complete, and if once again the R1 relay is energized, as by a manual force or through the operation of a shear or some other device operating upon the advanced sheet, the cycle will repeat itself again.

As previously described, this device is normally operated with the use of a pair of both stationary and movable gripping members. But, where a narrow sheet material is being acted upon, it may only be necessary to utilize a single stationary gripping member and movable gripping member. Furthermore, the roller brackets 6 of this device are portable, and selected brackets may be removed and more of them added to the sheet moving surface depending upon the width of the sheet being acted upon. Each bracket is formed proximate its rearwardly disposed end with a spring mounted plate 60, see FIG. 12, which engages a cross-rail 61 provided in the framework of this device, while the forward end of each bracket contains a stop 62, see FIG. 11, that engages a cross-rail 63 provided in the forward framework of this device. Thus, a roller bracket may be inserted in this device by simply engaging its plate 60 with the cross-rail 61, and through the exercise of force move the entire bracket rearwardly s'ightly so that its block 62 may clear the rail 63 for sliding downwardly adjacent thereto. When the bracket is released, the spring mounted plate 60 will force the block 62 snugly against cross-rail 63 to be held firmly in place. In addition, it is to be noted that the roller brackets located closest to the stationary and movable gripping members also contain a series of upwardly disposed rollers 64 that are mounted to a rail 65, and there is one of these rollers 64 disposed in close vertical alignment with each roller 7 so that the lateral edges of the sheet material may be embraced therebetween to maintain the sheet material always along the plane of the sheet moving surface, and always necessarily in the space intermediate the rod ends of both the movable and stationary gripping members.

The description of the preferred embodiment of this invention has been done for illustration purposes only, and the appended claims are designed to protect not only this described embodiment, but also any variations or modifications thereto which may fall within the spirit and scope of this invention and which would be obvious to one skilled in the art after analyzing the subject matter of this invention. For example, it may be feasible that a drive means other than a chain drive can be employed to achieve movement for the movable gripping members. For example, such drive means may include hydraulic motors or pneumatic motors for furnishing alternate movements to said movable gripping members. Furthermore, it is also conceivable that in place of using two motor-clutch combinations to move, in opposite directions, the movable grippers, a single reversing motor may operate just as effectively. Sheet material, as defined herein, can include either cut blanks of sheet material or continuous sheet material which is coiled upon a roll. These are merely illustrative.

Having thus described the invention, what is claimed and desired to be secured by Letters Patent is:

1. In a high speed mechanized sheet transferring device, a sheet moving surface formed by a series of rollers to facilitate movement of sheet material thereupon, movable gripping means operatively associated with said sheet moving surface and disposed for movement longitudinally of said surface, first after gripping the lateral edge of the adjacent sheet to advance it forwardly of the device, and secondly, to reurn to its initial position after releasing said sheet, drive means included in said device to effect alternate movements of said movable gripping means, a second gripping means stationarily disposed proximate said surface and provided for gripping and retaining said sheet during the return of said movable gripping means to its initial position, said gripping means being operative under the influence of pressure, the timing of the movements and clamping of said gripping means being responsive to the degree of pressure maintained in said pressure operated gripping means, said drive means comprises a chain drive arranged approximately the longitudinal length of said sheet moving surface, first motor-clutch means including a sprocket engaging said chain drive proximate one end of said surface and upon actuation moving said chain and movable gripping means in one direction, and a second motor-clutch means including a sprocket engaging said chain drive proximate the other end of said surface and upon actuation moving said chain drive and gripping means in the opposite direction.

2. The invention of claim 1 wherein said movable gripping means and chain drive are adjustable providing for adjustment in the limits of longitudinal movement of said movable gripping means with respect to said sheet moving surface.

3. In a high speed mechanized sheet transferring device, a sheet moving surface formed by a series of rollers to facilitate movement of sheet material thereupon, movable gripping means operatively associated with said sheet moving surface and disposed for movement longitudinally of said surface, first, after gripping the lateral edge of the adjacent sheet to advance it forwardly of the device, and secondly, to return it to its initial position after releasing said sheet, drive means included in said device to effect alternate movements to said movable gripping means, a second gripping means stationarily disposed proximate said surface and provided for gripping and retaining said sheet during the return of said movable gripping means to its initial position, said gripping means being operative under the influence of pressure, the timing of the movements and clamping of said gripping means being responsive to the degree of pressure maintained in said pressure operated gripping means, said movable gripping means comprises a pair of gripping members each capable of simultaneous longitudinal movements upon the energization of their respective drive means, said pair of gripping means capable of being laterally adjusted to their setting with respect to each other thereby providing for their being set in proximity with the lateral edges of the sheet material being moved by said movable gripping means, and said second gripping means comprising a pair of stationary gripping members disposed proximate the forward longitudinal end of said device, and capable of being set proximate the lateral edges of said sheet material to grip and hold the same upon return of said pair of movable gripping members to their initial positions.

4. The invention of claim 3 wherein said series of rollers forming the sheet moving surface includes at least one roller bracket disposed for arrangement along the longitudinal length of said device, said roller bracket including a series of longitudinally aligned rollers each arranged at equivalent heights so as to form an approximately planar surface to facilitate movement of the sheet material thereupon.

5. The invention of claim 4 wherein said roller brackets are capable of being removed from said device.

6. The invention of claim 3 wherein said drive means effects alternate movements of said movable gripping means up to the length of said sheet moving surface.

7. In a high speed mechanized sheet transferring device, a sheet moving surface formed by a series of rollers to facilitate the movement of continuous sheet material thereupon, movable gripping means operatively disposed with respect to said surface and arranged just adjacent said continuous sheet for clamping under the influence of fluid pressure its side and advancing it longitudinally of said surface, a second gripping means stationarily disposed with respect to said surface and provided for gripping under the influence of fluid pressure and retaining said sheet during the return of said movable gripping means to its initial position, drive means operatively associated with said movable gripping means for advancing and returning the same with respect to said surface, said drive means capable of longitudinal movement substantially equal to the length of said surface, said gripping means being rendered operative under the influence of said pressurized fluid, and the timing of the movements and clamping of said gripping means being responsive to the degree of fluid pressure maintained in said gripping means.

8. In a high speed mechanized sheet transferring device, a sheet moving surface formed by a series of rollers to facilitate movement of sheet material thereupon, movable gripping means operatively associated with said sheet moving surface and disposed for movement longitudinally of said surface, first, after gripping the lateral edge of the adjacent sheet to advance it forwardly of the device, and secondly, to return to its initial position after releasing said sheet, drive means included in said device to effect alternate movements of said gripping means, a second gripping means stationarily disposed proximate said surface and provided for gripping and retaining said sheet during the return of said movable gripping means to its initial position, said drive means comprising a chain drive arranged approximately the longitudinal length of said sheet moving surface, first motor-clutch means including a sprocket engaging said chain drive proximate one end of said surface and upon actuation moving said chain and movable gripping means in one direction, a second motor-clutch means including a sprocket engaging said chain drive proximate the other end of said surface and upon actuation moving said chain drive and gripping means in the opposite direction, said movable gripping means and chain drive are adjustable providing for adjustment in the limits of longitudinal movement of said movable gripping means with respect to said sheet moving surface, said first and second motor-clutch means being alternately electrically energized to provide for the alternate induced movements of said chain drive and movable gripping means, switch means its arranged in line with the longitudinal movements of said movable gripping means and disposed for being engaged by said gripping means as it achieves the limits of its longitudinal movements, and a speed reducing means provided on said movable gripping means to reduce its speed of movement as it approaches the limits of the alternate longitudinal movements.

9. In a high speed mechanized sheet transferring device, a sheet moving surface formed by a series of rollers to facilitate movement of sheet material thereupon, movable gripping means operatively associated with said sheet moving surface and disposed for movement longitudinally of said surface, first, after gripping the lateral edge of the adjacent sheet to advance it forwardly of the device, and secondly, to return to its initial position after releasing said sheet, drive means included in said device to effect alternate movements of said movable gripping means, a second gripping means stationarily disposed proximate said surface and provided for gripping and retaining said sheet during the return of said movable gripping means to its initial position, said drive means comprising a chain drive arranged approximately the longitudinal length of said sheet moving surface, a first motor means including a sprocket engaging said chain drive proximate one end of said surface and upon actuation moving said chain and movable gripping means in one direction, a second motor means including a sprocket engaging said chain drive proximate the other end of said surface and upon actuation moving said chain drive and gripping means in the opposite direction, said movable gripping means and chain drive are adjustable providing for adjustment in the limits of longitudinal movement of said movable gripping means with respect to said sheet moving surface, said first and second motor means being alternately energized to provide for the alternate induced movement of said chain drive and movable gripping means, switch means arranged in line with the longitudinal movements of said movable gripping means and disposed for being engaged by said gripping means as it achieves the limits of its longitudinal movements, and a speed reducing means provided on said movable gripping means to reduce its speed of movement as it approaches the limits of its alternate longitudinal movements.

* * * * *

UNITED STATES PATENT OFFICE
CERTIFICATE OF CORRECTION

Patent No. 3,753,522    Dated August 21, 1973

Inventor(s) Kenneth Voges

It is certified that error appears in the above-identified patent and that said Letters Patent are hereby corrected as shown below:

Claim 8, column 12, line 10, after the word "means" delete the word ---"its".

Signed and sealed this 2nd day of July 1974.

(SEAL)
Attest:

EDWARD M. FLETCHER, JR.
Attesting Officer

C. MARSHALL DANN
Commissioner of Patents